US011327921B2

(12) United States Patent
Ito

(10) Patent No.: US 11,327,921 B2
(45) Date of Patent: May 10, 2022

(54) CONTROL DEVICE AND INTER-MODULE COMMUNICATION METHOD

(71) Applicant: JTEKT CORPORATION, Osaka (JP)

(72) Inventor: Takanori Ito, Nishio (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/865,644

(22) Filed: May 4, 2020

(65) Prior Publication Data

US 2020/0356520 A1 Nov. 12, 2020

(30) Foreign Application Priority Data

May 9, 2019 (JP) .............................. JP2019-089104

(51) Int. Cl.
*G06F 13/42* (2006.01)
*G06F 13/40* (2006.01)

(52) U.S. Cl.
CPC ........ *G06F 13/4286* (2013.01); *G06F 13/409* (2013.01); *G06F 13/4045* (2013.01); *G06F 13/4068* (2013.01)

(58) Field of Classification Search
CPC .................................................. G06F 13/4286
See application file for complete search history.

(56) References Cited

U.S. PATENT DOCUMENTS

| 5,715,475 | A | * | 2/1998 | Munson | ............ | H04L 12/40117 |
|---|---|---|---|---|---|---|
| | | | | | | 348/E7.084 |
| 2005/0122915 | A1 | * | 6/2005 | Norizuki | ............. | H04L 61/6004 |
| | | | | | | 370/282 |
| 2011/0029705 | A1 | * | 2/2011 | Evans | ................. | G06F 13/4291 |
| | | | | | | 710/110 |
| 2017/0286351 | A1 | * | 10/2017 | Williams | .............. | H04L 67/104 |

FOREIGN PATENT DOCUMENTS

JP 2011-123688 A 6/2011

OTHER PUBLICATIONS

Wikipedia.com, Differential Signaling, Nov. 2015, pp. 1-3 (Year: 2015).*

* cited by examiner

*Primary Examiner* — Henry Tsai
*Assistant Examiner* — Dean Phan
(74) *Attorney, Agent, or Firm* — Oblon, McClelland, Maier & Neustadt, L.L.P.

(57) ABSTRACT

A programmable controller includes a plurality of modules arranged along a predetermined arrangement direction, and the plurality of modules includes a master station module and slave station modules. The programmable controller includes a main line configured to provide communication between the master station module and the slave station modules, and sub-lines configured to provide communication between two adjacent modules. The programmable controller sets station numbers of the slave station modules by communication via the sub-lines, and then performs communication via the main line using the set station numbers.

19 Claims, 5 Drawing Sheets

CONTROL DEVICE AND INTER-MODULE COMMUNICATION METHOD

CROSS REFERENCE TO RELATED APPLICATIONS

This application claims priority to Japanese Patent Application No. 2019-089104 filed on May 9, 2019, the content of which is incorporated herein by reference.

BACKGROUND

Field of the Invention

The present invention relates to a control device including modules and an inter-module communication method for performing communication between modules.

Related Art

A control device in related art having modules performs information exchange among modules by master and slave communication in which communication between modules is performed with one of the modules as a master station and other modules as slave stations. A programmable controller described in JP-2011-123688-A is a programmable controller for a machine tool or the like. The programmable controller includes modules, and each of the modules includes a station number switch to set a station number to itself. The programmable controller performs communication between the modules using this station number. However, operation on the station number switch by a user such as an operator may increase man-hours and may occur an error in setting the station number. The error in setting the station number causes an error in the communication between the modules.

SUMMARY

Embodiments of the present invention provide a control device that automatically sets a station number to each of modules and an inter-module communication method.

According to an embodiment of the present invention, the control device includes: a plurality of modules arranged along a predetermined arrangement direction, the plurality of modules including a master station module and slave station modules detachably attached to the master station module; a main line configured to provide communication between the master station module and the slave station modules; and sub lines, each of the sub lines configured to provide communication between two modules adjacent in the arrangement direction among the plurality of modules. The slave station modules are configured to set their own station numbers based on the communication via the sub lines, and the main station module and the slave station modules are configured to perform communication via the main line using the station numbers.

According to another embodiment of the present invention, the inter-module communication method performs communication between modules including a master station module and slave station modules. The inter-module communication method sets station numbers to respective slave station modules through one-to-one communication among the plurality of modules via sub lines, and performs communication between the master station module and the slave station modules via a main line using the station numbers.

DETAILED DESCRIPTION OF THE EXEMPLARY EMBODIMENTS

An embodiment of the present invention will be described with reference to FIGS. 1A to 3B. The embodiment described below is given as an appropriate example for carrying out the present invention and various preferable technical matters are specifically exemplified. However, the technical scope of the present invention is not limited to the specific embodiment.

Figure 1A:
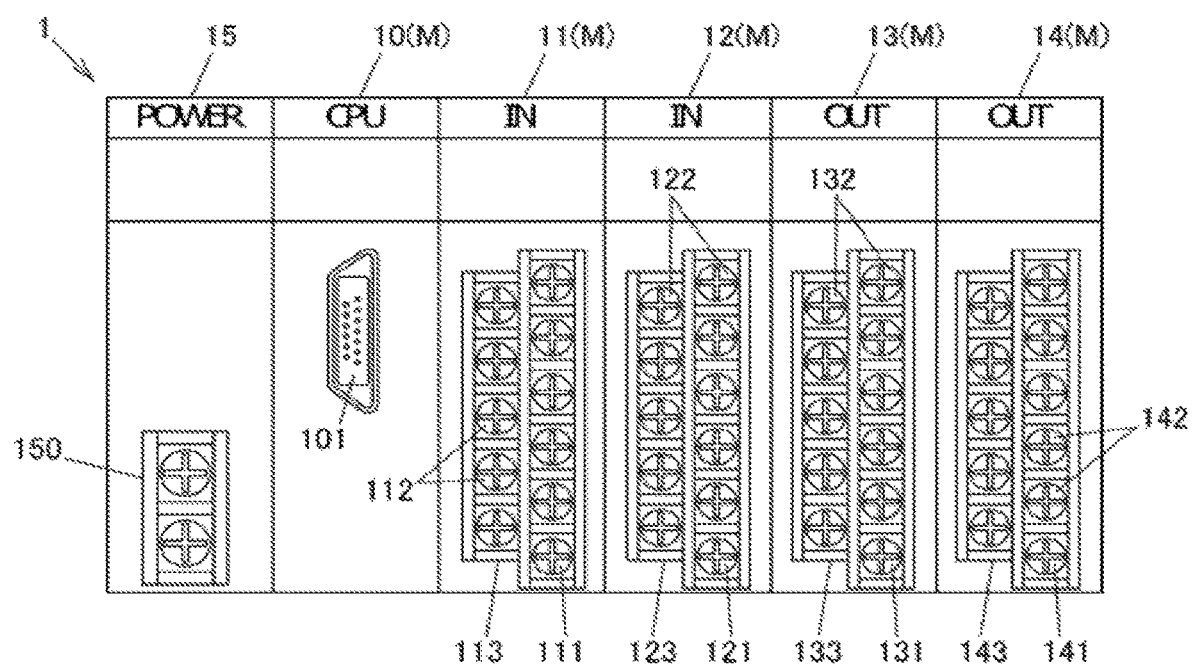
FIG. 1A is a front view of a programmable controller as a control device according to an embodiment of the present invention.
Figure 1B:
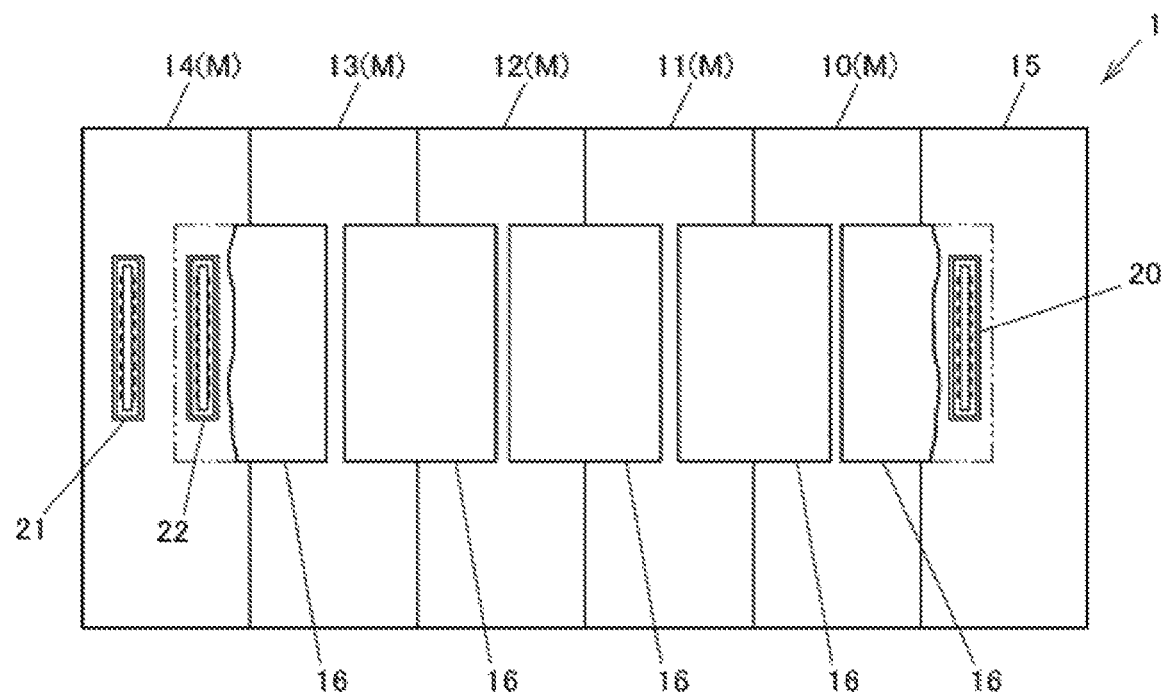
FIG. 1B is a rear view of the programmable controller.
Figure 2:
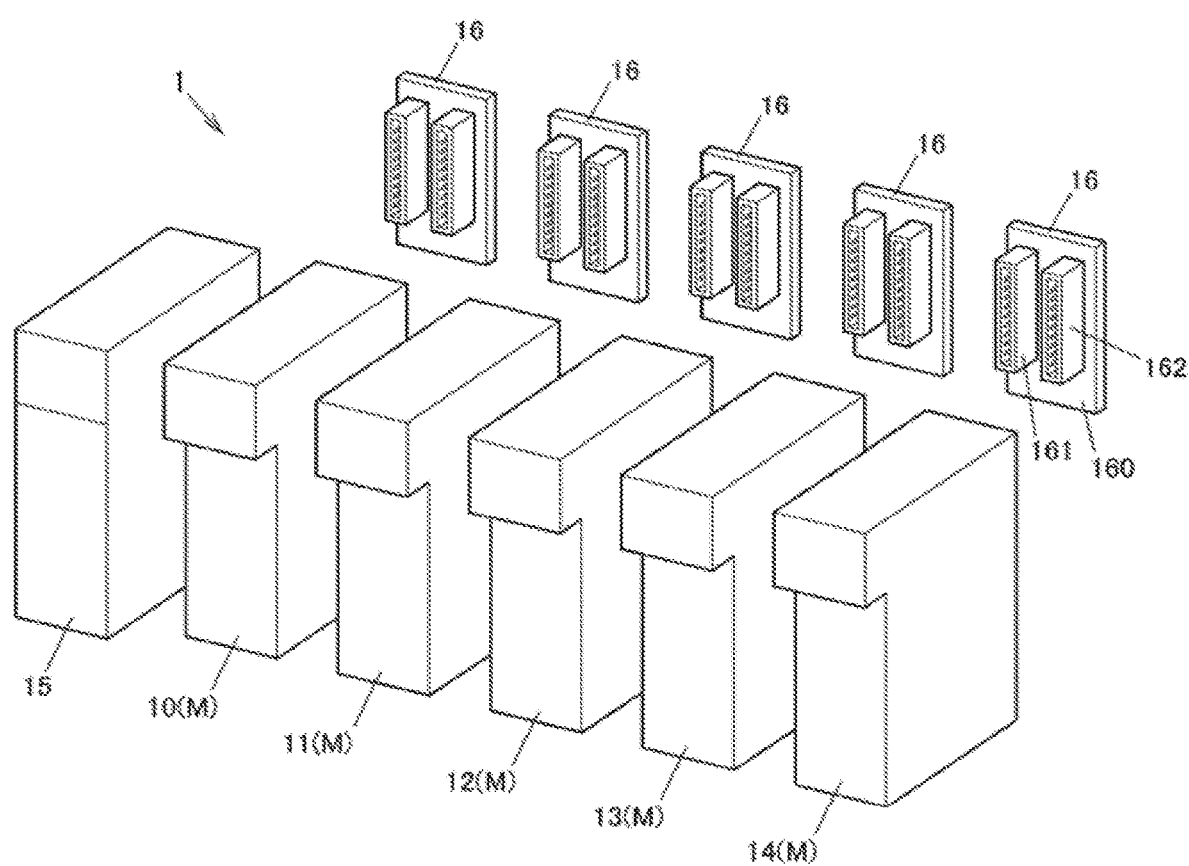
FIG. 2 is an exploded perspective view of the programmable controller.

FIG. 1A is a front view of a programmable controller as a control device according to an embodiment of the present invention, and FIG. 1B is a rear view of the programmable controller. FIG. 2 is an exploded perspective view of the programmable controller.

A programmable controller 1 is a control device that controls equipment such as a machine tool based on a set sequence program. The programmable controller 1 acquires signals from various sensors attached to parts of the equipment to be controlled, and operates actuators that operate the equipment.

The programmable controller 1 includes modules 10 to 14, a power supply unit 15, and backboards 16 as coupling members that couple the modules 10 to 14 and the power supply unit 15. Each of the modules 10 to 14 is an operation unit having an individual function. The power supply unit 15 supplies operation power to the modules 10 to 14. The power supply unit 15 includes a terminal block 150 to which an AC voltage of, for example, 100 V is input, converts the input AC voltage into a DC voltage, and outputs the DC voltage from a rear connector 20 described below.

The modules 10 to 14 perform communication via the backboards 16. Among the modules 10 to 14, the module 10 is a master station for communication, and the modules 11 to 14 are slave stations. Hereinafter, the module 10 is referred to as a master station module 10, and the modules 11 to 14 are referred to as a first slave station module 11 to a fourth slave station module 14. The master station module 10 and the first slave station module 11 to the fourth slave station module 14 may be collectively referred to as a module M.

The master station module 10 is arranged adjacent to the power supply unit 15. The first slave station module 11 to the fourth slave station module 14 are detachably attached to the master station module 10, and are arranged along a predetermined arrangement direction. In the present embodiment, the arrangement direction is a direction away from the master station module 10 toward a side opposite to the power supply unit 15.

As shown in FIG. 1A, when the programmable controller 1 is viewed from the front, the first slave station module 11 is arranged on a right side of the master station module 10, and the second slave station module 12 is arranged on a right side of the first slave station module 11. The third slave station module 13 is arranged on a right side of the second slave station module 12, and the fourth slave station module 14 is arranged on a right side of the third slave station module 13.

In the present embodiment, the master station module 10 has a central processing unit (CPU) function for controlling the equipment to be controlled by executing the sequence program. The master station module 10 includes a connector 101 to which an editing device that edits the sequence program, a monitor device that monitors an operation state of the programmable controller 1, and the like are connected.

The first slave station module 11 includes a terminal block 113 provided with a common terminal 111 that are electrically grounded and a plurality of input terminals 112. The second slave station module 12 includes a terminal block 123 provided with a common terminal 121 and a plurality of input terminals 122. Signal lines of various sensors are respectively connected to the plurality of input terminals 112, 122. The first slave station module 11 and the second slave station module 12 transmit ON/OFF states of the signals input to the plurality of input terminals 112, 122 to the master station module 10.

The third slave station module 13 includes a terminal block 133 provided with a common terminal 131 that are electrically grounded and a plurality of output terminals 132, and the fourth slave station module 14 includes a terminal block 134 provided with a common terminal 141 and a plurality of output terminals 142. The actuators are respectively connected to the plurality of output terminals 132, 142. The third slave station module 13 and the fourth slave station module 14 have an output function switchable between a conductive state in which a current for operating the actuator passes and a cutoff state in which the current is cut off. The third slave station module 13 and the fourth slave station module 14 receive the signal transmitted from the master station module 10 and switch each of the output terminals 132, 142 to the conductive state or the cutoff state.

The first slave station module 11 to the fourth slave station module 14 are not limited to the function exemplified above, and may have various functions. In addition, the number of slave station modules is not particularly limited.

The power supply unit 15 and the master station module 10, the master station module 10 and the first slave station module 11, the first slave station module 11 and the second slave station module 12, the second slave station module 12 and the third slave station module 13, and the third slave station module 13 and the fourth slave station module 14, are respectively connected by the backboards 16. As shown in FIG. 2, the backboard 16 includes a flat plate shaped base portion 160, and a first connector 161 and a second connector 162 protruding from the base portion 160.

The base portion 160 includes a printed circuit board (not shown), and a wiring pattern formed on the printed circuit board connects a plurality of terminals of the first connector 161 and a plurality of terminals of the second connector 162. In FIG. 2, terminal blocks 113, 123, 133, 143 of the first to fourth slave station modules 11 to 14 and the connector 101 of the master station module 10 are not shown.

In FIG. 1B, a part of the backboard 16 is broken, and an outline of the base portion 160 of the broken part is indicated by a virtual line (a two-dot chain line). As shown in FIG. 1B, the power supply unit 15 includes the rear connector 20 on a rear surface thereof. The rear connector 20 is fitted to the first connector 161 of the backboard 16 that connects the power supply unit 15 and the master station module 10. The power supply unit 15 supplies the operation power from the rear connector 20 to the modules 10 to 14 via the backboards 16.

Each of the master station module 10 and the first slave station module 11 to the fourth slave station module 14 has a first rear connector 21 and a second rear connector 22 on a back surface thereof. FIG. 1B shows the first rear connector 21 and the second rear connector 22 of the fourth slave station module 14. For a pair of modules M adjacent in the arrangement direction, the first connector 161 of the backboard 16 is fitted to the first rear connector 21 of one module M on a power supply unit 15 side, and the second connector 162 of the backboard 16 is fitted to the second rear connector 22 of the other module M.

Figure 3A:
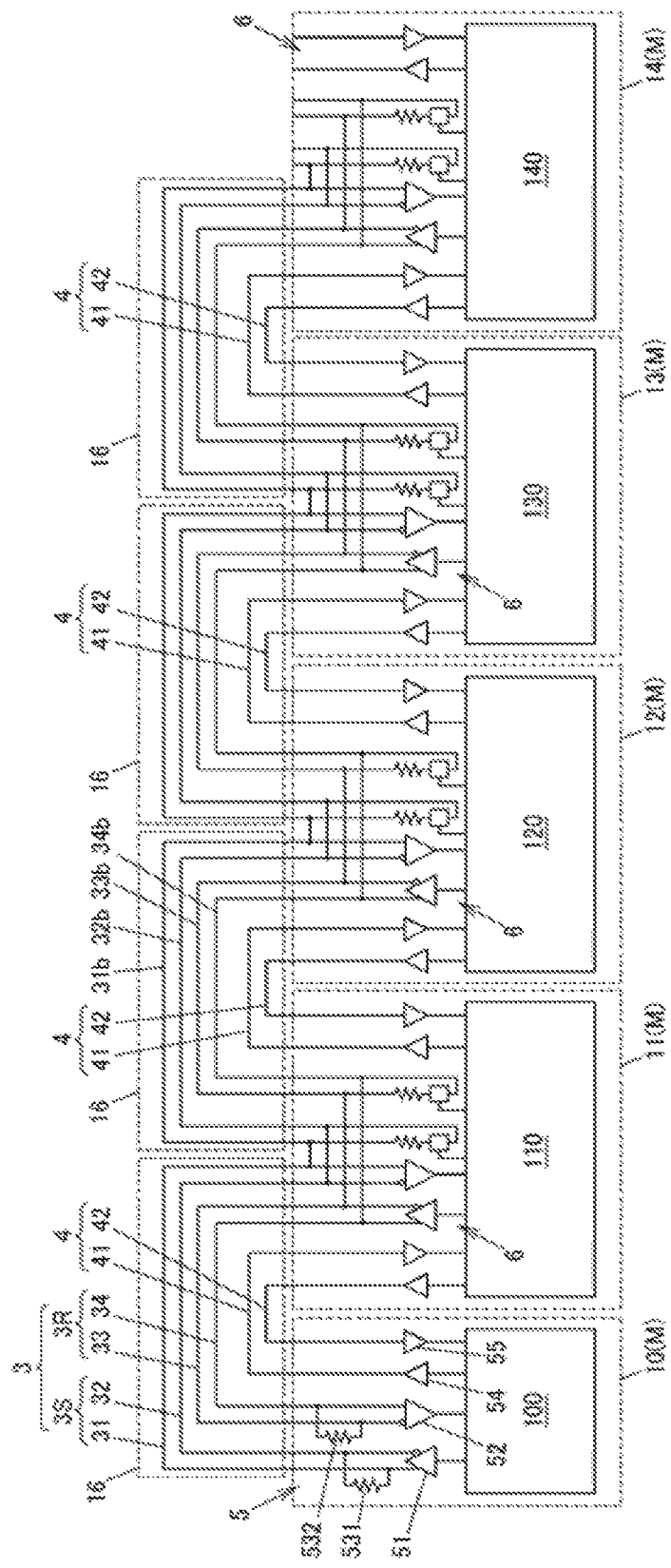
FIG. 3A is a circuit diagram showing a configuration of a master station module and a first slave station module to a fourth slave station module for inter-module communication, together with wiring in backboards.
Figure 3B:
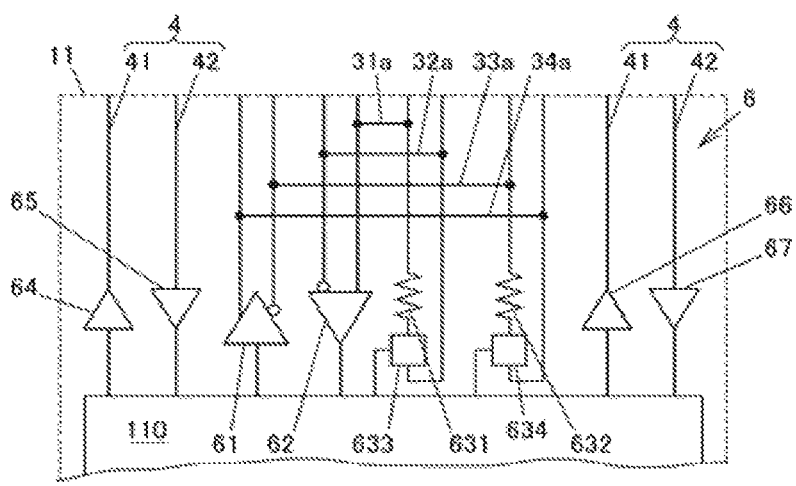
FIG. 3B is an enlarged view of a part of a circuit shown in FIG. 3A.

Next, an inter-module communication method between the master station module 10 and the first slave station module 11 to the fourth slave station module 14, and a configuration for inter-module communication will be described with reference to FIGS. 3A and 3B. FIG. 3A is a circuit diagram showing the configuration of the master station module 10 and the first slave station module 11 to the fourth slave station module 14 for the inter-module communication, together with wiring in the backboards 16. FIG. 3B is an enlarged view of a part of a circuit shown in FIG. 3A. Hereinafter, in the inter-module communication, a master station module 10 side is referred to as an upstream side and a fourth slave station module 14 side is referred to as a downstream side for convenience of description.

The programmable controller 1 includes a main line 3 and sub-lines 4. The main line 3 is used for communication between the master station module 10 and the first slave station module 11 to the fourth slave station module 14, and each of the sub-lines 4 is used for one-to-one communication between two modules M adjacent in the arrangement direction. The programmable controller 1 sets respective station numbers of the master station module 10 and the first slave station module 11 to the fourth slave station module 14 through communication via the sub-lines 4, and performs communication via the main line 3 using the set station numbers.

In the present embodiment, the programmable controller 1 performs, for example, four-wire full-duplex multi-drop communication according to a communication protocol of RS485 as the communication via the main line 3. The main line 3 includes a pair of differential signal lines 31, 32 as a transmission line 3S for the master station module 10 to transmit signals to the first slave station module 11 to the fourth slave station module 14, and includes a pair of differential signal lines 33, 34 as a reception line 3R for the master station module 10 to receive the signals from the first slave station module 11 to the fourth slave station module 14.

These differential signal lines 31 to 34 reach the fourth slave station module 14 serving as an terminal station via the backboards 16 and the first slave station module 11 to the third slave station module 13 from the master station module 10 serving as a start station. More specifically, each of the first slave station module 11 to the fourth slave station module 14 includes module side branch lines 31a, 32a, 33a and 34a, and each of the backboards 16 includes back board side branch lines 31b, 32b, 33b and 34b. The module side branch lines 31a, 32a, 33a, 34a and the backboard side branch lines 31b, 32b, 33b, 34b are connected to each other with the first connector 161 and the second connector 162, forming the differential signal lines 31 to 34.

For example, when the communication is performed between the master station module 10 and the fourth slave station module 14, the main line 3 configured as described above provides direct transmission and reception between the master station module 10 and the fourth slave station module 14 without requiring relay processing by processing units 110, 120, 130 of the first to third slave station modules 11 to 13. This brings faster communication.

Each of the sub-lines 4 includes a downstream signal line 41 that transmits a signal from an upstream module M to a downstream module M, and an upstream signal line 42 that transmits the signal from the downstream module M to the upstream module M. The backboards 16 are involved in each of the sub-lines 4.

The master station module 10 includes a processing unit 100 that performs processing such as execution of the sequence program as a CPU function, and a communication circuit 5. The communication circuit 5 includes a differential transceiver 51 that transmits a signal to the transmission line 3S, a differential receiver 52 that receives the signal transmitted by the reception line 3R, a first termination resistor 531 connected between the pair of differential signal lines 31, 32 as the transmission line 3S, a second termination resistor 532 connected between the pair of differential signal lines 33, 34 as the reception line 3R, and a driver that transmits a signal to the downstream signal line 41, and a receiver 55 that receives a signal sent by the upstream signal line 42.

The first slave station module 11 includes the processing unit 110, and the second slave station module 12 includes the processing unit 120. The processing units 110, 120 determine an ON/OFF state of the signal input to each of the input terminals 112, 122, and transmit the signal to the master station module 10. The third slave station module 13 includes the processing unit 130, and the fourth slave station module 14 includes the processing unit 140. The processing units 130, 140 perform the output function of switching a state of each of the output terminals 132, 142 and the common terminals 131, 141 to the conductive state or the cutoff state based on the signal transmitted from the master station module 10.

Each of the first slave station module 11 to the fourth slave station module 14 further includes a communication circuit 6. FIG. 3B shows the communication circuit 6 of the first slave station module 11 as an example. The communication circuits 6 of the second slave station module 12 to the fourth slave station module 14 are similarly configured.

The communication circuit 6 includes a differential transceiver 61 that transmits a signal to the reception line 3R, a differential receiver 62 that receives the signal transmitted by the transmission line 3S, a first termination resistor 631 and a second termination resistor 632, a first switching element 633 connected in series with the first termination resistor 631, a second switching element 634 connected in series with the second termination resistor 632, a driver 64 and a receiver 65 for communication with the upstream module M by the sub-line 4, a driver 66 and a receiver 67 for communication with the downstream module M by the sub-line 4.

The first switching element 633 switches between a connection state in which the first termination resistor 631 is connected between the differential signal lines 31, 32 as the transmission line 3S and a cutoff state in which the connection is cut off. The second switching element 634 switches between a connection state in which the second termination resistor 632 is connected between the differential signal lines 33, 34 as the reception line 3R and a cutoff state in which the connection is cut off. The first switching element 633 and the second switching element 634 are, for example, field effect transistor (FET) switches, and may be, for example, relays that can electrically switch between the connection state and the cutoff state.

The master station module 10 and the first slave station module 11 to the fourth slave station module 14 perform communication by differential signals propagating through the pair of differential signal lines 31, 32 as the transmission line 3S and the pair of differential signal lines 33, 34 as the reception line 3R. A frame transmitted by the pair of differential signal lines 31, 32 and the pair of differential signal lines 33, 34 includes information on a station number of a transmission source and a station number of a transmission destination in a header.

Next, setting of a station number for communication using the main line 3 will be described. In the present embodiment, respective station numbers of modules M are automatically set during setup, after the master station module 10 and the first slave station module 11 to the fourth slave station module 14 are connected by the backboards 16, without manual operation of setting station numbers by a user such as an operator. Specifically, a station number of the master station module 10 is set to 0 (zero), and station numbers are sequentially added and set from the first slave station module 11 adjacent to the master station module 10 in the above arrangement direction. That is, the station number of the first slave station module 11 is set to 1, the station number of the second slave station module 12 is set to 2, the station number of the third slave station module 13 is set to 3, and the station number of the fourth slave station module 14 is set to 4.

In the setting of the station number, the master station module 10 transmits information indicating that the own station number (the station number of the master station module 10) is 0 to the first slave station module 11 via the sub-line 4. The first slave station module 11 receives this information, setting the station number (1) obtained by adding 1 to the received station number (0) as the own station number, and transmitting information indicating that the own station number is 1 to the second slave station module 12 on a downstream side via the sub-line 4. In this way, each of the first slave station module 11 to the fourth slave station module 14 receives information on the station number of the module M from the module M adjacent on an upstream side, setting the own station number, and transmitting information on the set own station number to the module M adjacent on the downstream side.

Since no other module exist adjacent on the downstream side of the fourth slave station module 14 arranged at a position farthest from the master station module 10, even if the fourth slave station module 14 transmits the information on the own station number from the driver 66, the fourth slave station module 14 receives no reply from the other module. Thereby, the fourth slave station module 14 determines that the own station is the terminal station. Then, the fourth slave station module 14 notifies the third slave station module 13 on the upstream side of completion of the setting of all station numbers of the first slave station module 11 to the fourth slave station module 14 via the sub-line 4.

This notification is sequentially transferred to the third slave station module 13, the second slave station module 12 and the first slave station module 11 via the sub-lines 4. Then, the master station module 10 receives this notification from the first slave station module 11 via the sub-line 4. The master station module 10 that has received the notification starts communication with the first slave station module 11 to the fourth slave station module 14 via the main line 3. The first slave station module 11 to the fourth slave station module 14 store the set own station number in a nonvolatile memory. Thereby, different station numbers are automatically set to the master station module 10 and the first slave station module 11 to the fourth slave station module 14, respectively.

The programmable controller 1 may perform the automatic setting of the station numbers according to the above procedure only once during setup of the programmable controller 1, but may perform again the automatic setting of the station numbers according to the same procedure as described above during start of the programmable controller 1 when power is supplied, for example. When any station number set during resetting is different from the station number stored in the nonvolatile memory, for example, an abnormality such as a change in a connection order of the modules M may have occurred in maintenance work, so that the programmable controller 1 calls attention to the operator or the like by alarming with a warning sound or display, and stops execution of the sequence program by the master station module 10 until the abnormal state is released.

When the fourth slave station module 14 determines that the own station is the terminal station, the fourth slave station module 14 sets the first switching element 633 and the second switching element 634 to the connection state. One end of the first termination resistor 631 is connected to the differential signal line 31, and the first switching element 633 is connected between the other end of the first termination resistor 631 and the differential signal line 32. When the first switching element 633 is in the connection state, the first termination resistor 631 is connected between the pair of differential signal lines 31, 32 as the transmission line 3S. Similarly, one end of the second termination resistor 632 is connected to the differential signal line 33, and the second switching element 634 is connected between the other end of the second termination resistor 632 and the differential signal line 34. When the second switching element 634 is in the connection state, the second termination resistor 632 is connected between the pair of differential signal lines 33, 34 as the reception line 3R. Connecting the pair of differential signal lines 31, 32 via the first termination resistor 631 and connecting the pair of differential signal lines 33, 34 via the second termination resistor 632 prevent undershoot and overshoot of the voltage at the differential signal lines 31 to 34, and provide stable communication.

The module M (the first slave station module 11 to the third slave station module 13 in the above example) that determines that the own station is a non-terminal station set the first switching element 633 and the second switching element 634 into the cutoff state.

According to the embodiment described above, the programmable controller 1 automatically sets station numbers of modules M, thereby reducing man-hours of the operator and preventing an error in setting the station number. The fourth slave station module 14 serving as the terminal station automatically connects the first termination resistor 631 between the pair of differential signal lines 31, 32 as the transmission line 3S, and automatically connects the second termination resistor 632 between the pair of differential signal lines 33, 34 as the reception line 3R, thereby further reducing the man-hours of the operator and preventing communication instability due to forgetting to connect the termination resistor or causing a work error in connecting the termination resistor.

The present invention has been described based on the embodiments. However, these embodiments do not limit the invention according to the claims. It should be noted that not all combinations of the features described in the embodiments are essential to the means for solving the problem of the invention.

The present invention can be appropriately modified and carried out without departing from the spirit of the prevent invention. For example, although the programmable controller 1 has been described in the above embodiment, the present invention can also be applied to various control devices other than the programmable controller.

Although communication using a four-wire full-duplex multi-drop method has been described as the communication via the main line 3 in the above embodiment, the communication method is not limited thereto, and may be, for example, a two-wire half-duplex multi-drop method. A standard for the communication via the main line 3 is not limited to the RS 485, and may be another serial communication standard.

What is claimed is:

1. A control device comprising:
   a plurality of modules arranged along an arrangement direction, the plurality of modules including a master station module and slave station modules detachably attached to the master station module;
   a main line configured to provide communication between the master station module and the slave station modules; and
   sub lines, each of the sub lines configured to provide bi-directional communication between two modules adjacent in the arrangement direction among the plurality of modules, wherein
   the slave station modules are configured to set their own station numbers based on the communication via the sub lines,
   each of the slave station modules is configured to transmit information on its own station number to an adjacent module on a downstream side using a downlink channel of a corresponding one of the sub lines and transmit information indicating completion of setting of all station numbers to an adjacent module on an upstream side using an uplink channel of a corresponding one of the sub lines, and
   the master station module and the slave station modules are configured to perform communication via the main line using the station numbers.

2. The control device according to claim 1, wherein the slave station modules are configured to set the station numbers sequentially in arrangement order from one of the slave station modules adjacent to the master station module.

3. The control device according to claim 1, wherein each of the slave station modules is configured to:
   receive, from one of the slave station modules adjacent on a first side close to the master station module along the arrangement direction, information on a station number of the one,
   set an own station number, and
   transmit, to another of the slave station modules adjacent on a second side far from the master station module, information on the set own station number.

4. The control device according to claim 3, wherein one of the slave station modules arranged at a position farthest from the master station module is configured to:
   determine itself as a terminal station based on failing to communicate with a module on the second side, and
   notify the master station module of completion of setting of the station numbers of the slave station modules by communication via the sub lines.

5. The control device according to claim 4, wherein
the main line includes a pair of differential signal lines,
the master station module and each of the slave station modules are configured to perform communication by a differential signal propagating through the pair of differential signal lines,
each of the slave station modules includes a termination resistor connectable between the pair of differential signal lines, and
the one of the slave station modules serving as the terminal station is configured to switch the termination resistor between the pair of differential signal lines from a cut off state to a connection state.

6. The control device according to claim 3, wherein each of the slave station modules is configured to set the own station number based upon the station number of the one of the slave station modules adjacent on the first side.

7. The control device according to claim 1, wherein the sub lines each include a pair of lines between the two modules adjacent in the arrangement direction.

8. The control device according to claim 7, wherein the pair of lines includes:
a downstream signal line, and
an upstream signal line.

9. The control device according to claim 1, wherein the main line includes two pair of differential signal lines.

10. The control device according to claim 9, wherein the two pair of differential signal lines includes:
a first pair of differential signal lines as a reception signal line, and
a second pair of differential signal lines as a transmission signal line.

11. The control device according to claim 1, wherein the main line includes a reception signal line and a transmission signal line.

12. The control device according to claim 11, wherein
the reception signal line includes a first pair of differential signal lines, and
the transmission signal line includes a second pair of differential signal lines.

13. The control device according to claim 4, wherein
each of the slave station modules includes a termination resistor connected to the main line, and
the one of the slave station module serving as the terminal station is configured to switch the termination resistor from a cut off state to a connections state in response to the determining itself as the terminal station.

14. The control device according to claim 5, wherein the one of the slave station modules serving as the terminal station is configured to switch the termination resistor between the pair of differential signal lines from the cut off state to the connection state in response to the determining itself as the terminal station.

15. The control device according to claim 1, wherein each of the slave station modules is configured to set their own station numbers based upon a station number of one of the plurality of modules adjacent in an upstream direction using the communication via the sub lines.

16. The control device according to claim 1, wherein each of the slave station modules is configured to notify the master station module of completion of setting of the station numbers of the slave station modules by communication via the sub lines.

17. The control device according to claim 1, wherein
each of the slave station modules comprises a nonvolatile memory, and
each of the slave station modules is configured to:
store, in the nonvolatile memory, an own station number which has been set;
reset the own station number based on the communication via the sub lines during start of the control device; and
determine the own station number by comparing the own station number which has been reset with the own station number stored in the nonvolatile memory.

18. The control device according to claim 1, further comprising
a backboard; and
a pair of connectors provided on the backboard,
wherein the main line and one of the sub lines connect the pair of connectors.

19. An inter-module communication method for performing communication between a plurality of modules including a master station module and slave station modules, the inter-module communication method comprising:
setting station numbers to respective slave station modules through one-to-one bi-directional communication among the plurality of modules via sub lines;
transmitting, by each of the respective slave station modules, information on its own station number to an adjacent module on a downstream side using a downlink channel of a corresponding one of the sub lines; and
transmitting, by each of the respective slave station modules, information indicating completion of setting of all station numbers to an adjacent module on an upstream side using an uplink channel of a corresponding one of the sub lines; and
performing communication between the master station module and the slave station modules via a main line using the station numbers.

* * * * *